(12) United States Patent
Iwamoto et al.

(10) Patent No.: US 9,213,377 B2
(45) Date of Patent: Dec. 15, 2015

(54) ELECTRONIC DEVICE

(71) Applicant: Panasonic Corporation, Osaka (JP)

(72) Inventors: Akira Iwamoto, Osaka (JP); Tadashi Matsunobe, Osaka (JP); Masaru Furujiku, Osaka (JP); Jun Satoh, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 188 days.

(21) Appl. No.: 13/959,101

(22) Filed: Aug. 5, 2013

(65) Prior Publication Data

US 2014/0182926 A1   Jul. 3, 2014

(30) Foreign Application Priority Data

Dec. 27, 2012   (JP) ................. 2012-285284

(51) Int. Cl.
  *G06F 1/18*   (2006.01)
  *G06F 1/16*   (2006.01)

(52) U.S. Cl.
  CPC .............. *G06F 1/184* (2013.01); *G06F 1/1626* (2013.01); *G06F 1/1658* (2013.01)

(58) Field of Classification Search
  USPC .................. 361/728–730, 752, 796
  See application file for complete search history.

(56) References Cited

U.S. PATENT DOCUMENTS

2010/0142148 A1*   6/2010   Nitta et al. .................... 361/699

FOREIGN PATENT DOCUMENTS

JP           2004-214329         7/2004

* cited by examiner

*Primary Examiner* — Jenny L Wagner
*Assistant Examiner* — Ahmad D Barnes
(74) *Attorney, Agent, or Firm* — Hamre, Schumann, Mueller & Larson, P.C.

(57) ABSTRACT

There is provided an electronic device includes a casing; a substrate which is arranged inside the casing, and provided with a fixation hole; a fixation member which is integrally formed with the casing, and inserted into the fixation hole of the casing, and positioned therein so that an outer periphery thereof is apart from an inner periphery of the fixation hole; and a first elastic body which is disposed in a surrounding area of the fixation hole, and sandwiched between the casing and a front surface of the substrate.

7 Claims, 5 Drawing Sheets

ELECTRONIC DEVICE

BACKGROUND OF THE INVENTION

1. Field of the Invention

The present disclosure relates to an electronic device and, more particularly, to an electronic device including a substrate such as a printed circuit board and the like inside the casing thereof.

2. Description of the Related Art

As well known, in an electronic device such as a personal computer and an information terminal device, or a portable electronic device such as a so-called tablet type or a notebook type computer and a tablet type mobile information terminal, a substrate such as a printed circuit board is housed and held inside the casing of the electronic device. In holding the substrate inside the casing of the electronic device, it is common to hold the substrate by rigidly fixing it to the casing (refer to Japanese Patent Laid-open Publication No. 2004-214329, for example).

SUMMARY OF THE DISCLOSURE

However, in the case where the substrate is rigidly fixed to the casing, the deflection of the casing is directly transmitted to the substrate when a load is applied to the casing and thereby causing the deflection thereof, consequently the operation and/or function of the electronic components mounted on the substrate may be adversely affected.

To cope therewith, One non-limiting and exemplary embodiment provides an electronic device capable of restraining the transmission of the deflection caused on the casing to the substrate, in an electronic device including a substrate inside the casing thereof.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

According to one general aspect of the present disclosure, there is provided an electronic device including: a casing; a substrate which is arranged inside the casing, and provided with a fixation hole; a fixation member which is integrally formed with the casing, and inserted into the fixation hole of the casing, and positioned therein so that an outer periphery thereof is apart from an inner periphery of the fixation hole; and a first elastic body which is disposed in a surrounding area of the fixation hole, and sandwiched between the casing and a front surface of the substrate.

With the electronic device according to the present disclosure, in the state where the fixation member integrally formed with the casing is inserted into the fixation hole of the substrate, the outer periphery of the fixation member is apart from the inner periphery of the fixation hole. Accordingly, even when a deflection of the casing is caused, it is possible to effectively restrain the transmission of the deflection caused in the casing to the substrate, since the fixation member can displace within the fixation hole of the substrate in a direction along the surface of the substrate. Further, since an elastic body is sandwiched between the casing and the front surface of the substrate, it is possible to absorb the component of the deflection, within the elastic range of the elastic body, in the direction perpendicular to the surface of the substrate. Consequently, it is possible to reduce an adverse effect of the deflection of the casing in that direction.

DETAILED DESCRIPTION

Figure 1:
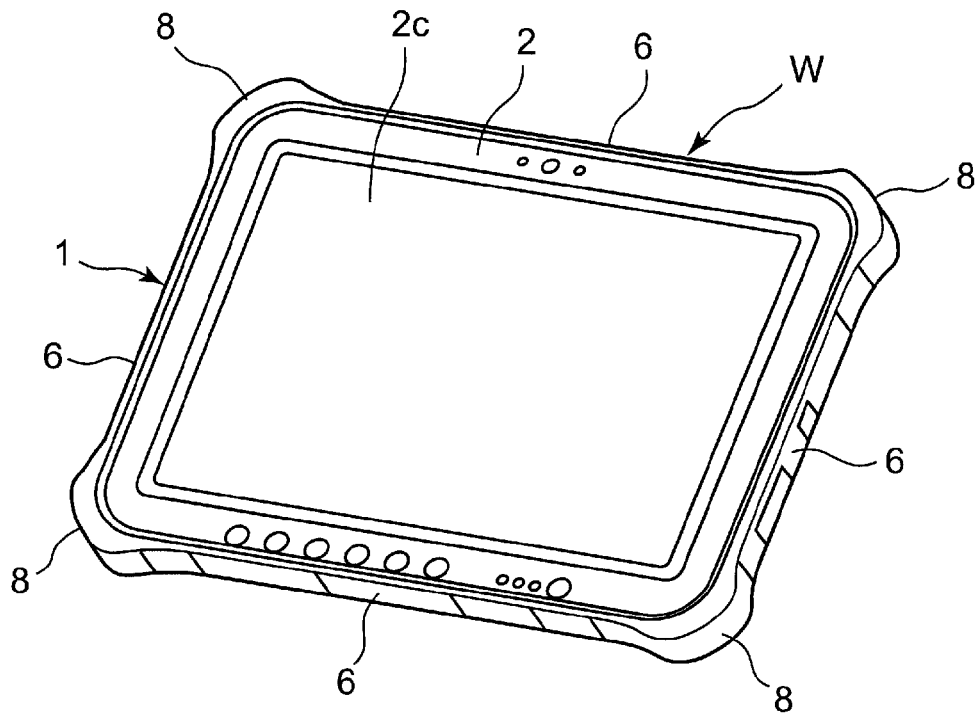
FIG. 1 is a perspective view illustrating a tablet terminal device on a display screen side according to an embodiment of the present disclosure.

An electronic device according to the present disclosure can be embodied in aspects below in addition to the aforementioned basic structure. Specifically, the electronic device may further includes: a second elastic body which is disposed in a surrounding area of the fixation hole, and sandwiched between the casing and a back surface of the substrate.

With this structure, it is possible to more efficiently absorb the component of the deflection, within the elastic range of the elastic bodies, in the direction perpendicular to the surface of the substrate.

Further, in this case, the fixation member may include a first fixation member and a second fixation member; wherein a tip of the first fixation member protrudes from the substrate in a state where the first fixation member is inserted into the fixation hole; and wherein a part of the second fixation member faces to the first fixation member, and the first or the second elastic body is disposed between the part of the second fixation member and the substrate.

With this structure, the fixation member is formed by a plurality of members. Accordingly, in contradistinction to the case where the fixation member is formed by one-body, it becomes easier to insert the fixation member into the fixation hole, and in addition, it becomes easier to dispose the elastic bodies between the fixation member and the substrate.

Furthermore, in the above case, a part of the fixation member may be a stepped boss integrally formed with the casing, and the first or the second elastic body may be disposed between a step surface of the stepped boss and the substrate.

With this structure, it is possible to sandwich the first or the second elastic body between the substrate and the step surface forming the step of the stepped boss. Thereby, it is possible to simplify the structure of the assembling portion of the substrate and the elastic body, and enhance the workability in assembly work.

Moreover, in the above case, the fixation member may be configured as a protection member configured to cover and protect at least a part of the front surface of the substrate.

With this structure, by covering at least a part of the front surface of the substrate with the protection member, it is possible to protect the electronic component on the substrate in the covered region by the protection member. Further, in the case where the above described structure is employed, it is possible to obtain the above described effect by utilizing the protection member.

Moreover, in the above case, a notch oriented to a predetermined direction may be formed in at least one of the first and the second elastic bodies.

With this structure, it is possible to adjust the elastic displacement property of the elastic body so that the elastic displacement in the predetermined direction to which the notch is oriented is larger than those in other directions, thereby providing the elastic function by the elastic body with a directivity. Therefore, by orienting the direction to which the notch is oriented to a direction of a region in which a more important electronic component or more sensitive electronic component to the strain is arranged, it is possible to effectively reduce an adverse effect on the electronic component caused from the deflection of the casing.

Moreover, in the above case, the substrate may include three fixation holes which are not in alignment with each other in a plane view, at least a major portion of a CPU (Central Processing Unit) is arranged within a triangular region formed by the three fixation holes.

With this structure, the transmission of the deflection caused in the casing to the substrate is effectively restrained in the triangular region formed by the three fixation holes. Therefore, by arranging at least a major portion of the CPU in the triangular region, it is possible to effectively reduce an adverse effect on the electronic component caused from the deflection of the casing.

EMBODIMENTS

Hereinafter, an embodiment will be described in detail with reference to the drawings, appropriately. However, descriptions in detail more than necessary may be omitted. For example, matters which have been already well known may not be described in detail, and substantially the same configurations may not be described redundantly. This is for avoiding the following descriptions from being unnecessarily redundant and for allowing those skilled in the art to easily understand them.

Further, the present inventor(s) gives the accompanying drawings and the following descriptions for allowing those skilled in the art to sufficiently understand the present disclosure, and the main theme defined in the claims is not intended to be restricted thereby.

Further, in the following description, terms which denote certain directions (such as "upper", "lower", "left", "right" and other terms including these terms, "clockwise", "counterclockwise") may be used, but the use of them is merely for ease of understanding of the disclosure with reference to the drawings, and the present disclosure should not be restrictively understood by the meanings of these terms.

The embodiment of the present disclosure which will be described later is an example where the present disclosure is applied to a so-called tablet type portable information terminal device (hereinafter, appropriately referred to as a "tablet terminal device" or simply referred to as a "device").

Figure 2:
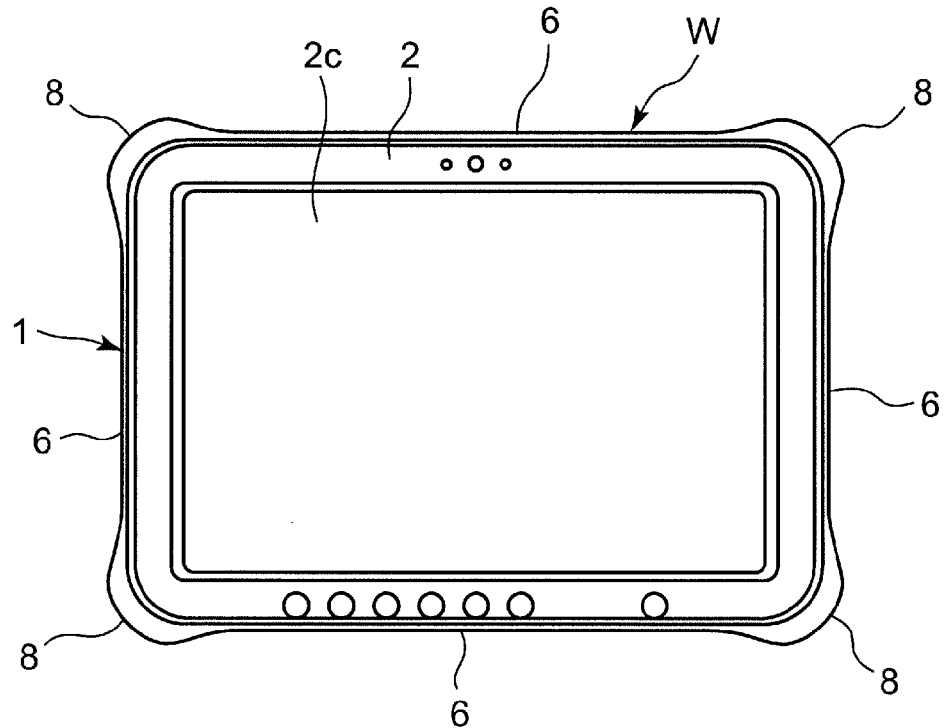
FIG. 2 is a plane view illustrating the tablet terminal device.
Figure 3:
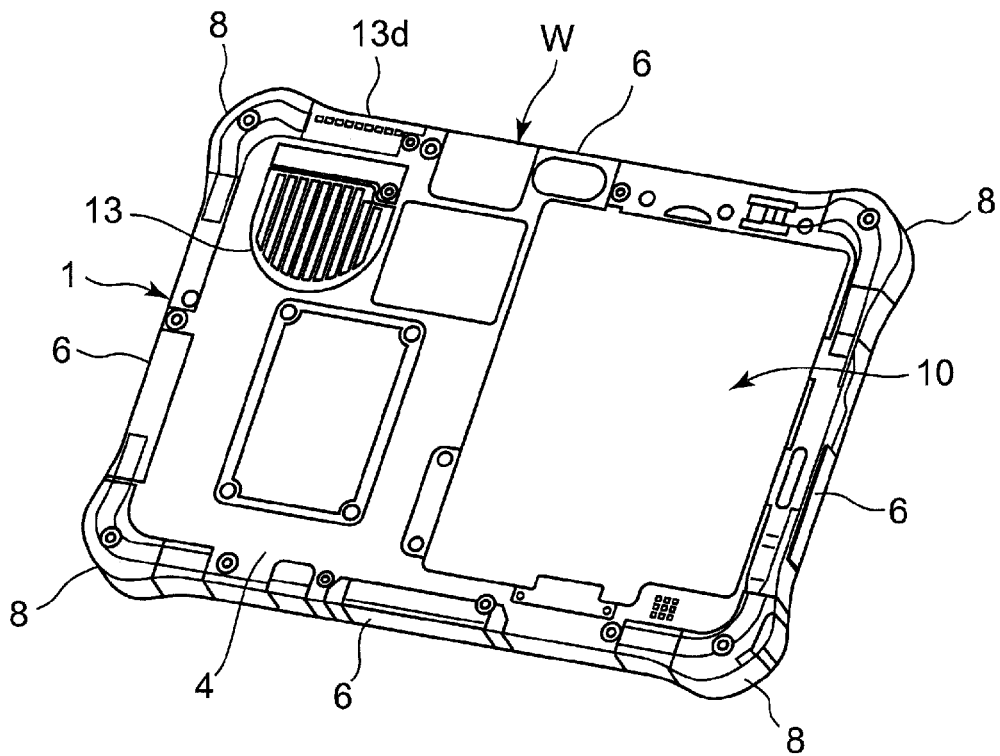
FIG. 3 is a perspective view illustrating the tablet terminal device on a back side.
Figure 4:
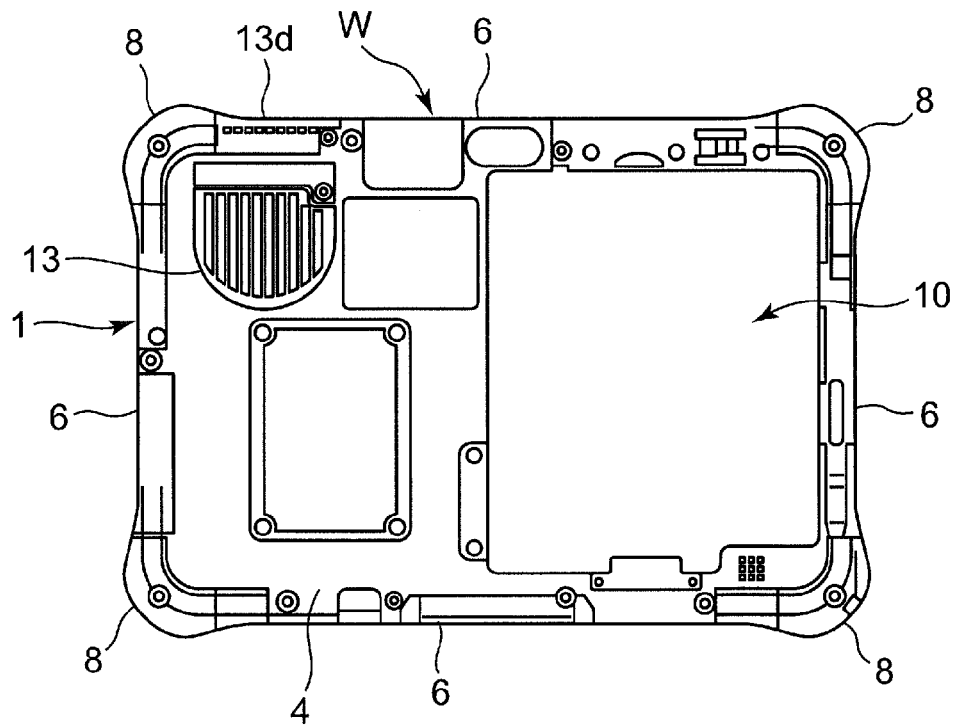
FIG. 4 is a rear view illustrating the tablet terminal device.

FIG. 1 and FIG. 2 are a perspective view and a plan view illustrating a tablet terminal device as the electronic device on a display screen side according to the present embodiment, respectively. Moreover, FIG. 3 and FIG. 4 are a perspective view and a plan view illustrating the tablet terminal device on the back side, respectively.

As illustrated in FIG. 1 to FIG. 4, a tablet terminal device W according to the present embodiment includes a casing 1 that is formed into a substantially quadrangular shape, as viewed on a plane, and has a predetermined thickness (i.e., a predetermined height). The casing 1 has, as its outer surface, an upper surface 2 and a lower surface 4 that are vertically disposed opposite to each other and a side surface 6 for connecting the peripheral edges of the surfaces 2 and 4 to each other. The side surfaces 6 are configured to have two pairs of substantially flat surfaces disposed opposite to each other as essential surfaces.

In the present embodiment, a bulge portion 8 bulging outward of the casing 1 in a curved manner is formed at each of corners of the casing 1, in order to enhance shock resistance when the device W falls down. Essential parts of the casing 1 are made of a metallic material such as magnesium (Mg) so as to secure mechanical rigidity or the like. The four bulge portions 8 are made of a material having a higher elasticity than that of the material of the casing 1, for example, an elastomer. These bulge portions 8 are attached to the corners of the Mg casing 1, and thus, are fixed to the casing 1.

The size and weight of the tablet terminal device W are set so as to ensure the portability thereof. A display screen 2c made of, for example, a liquid crystal is disposed at the upper surface 2 of the casing 1. The display screen 2c is also used as an input screen of a touch panel type. In the meantime, a battery pack 10 serving as a mobile power source is loaded at the lower surface 4 (i.e., a back side) of the casing 1. The battery pack 10 has a predetermined thickness and is formed into a substantially quadrangular shape, as viewed on a plane.

A space (not shown) formed between the upper surface 2 and the lower surface 4 accommodates various electronic components (not shown) such as signal processing circuits and central processing units (CPUs), various control devices (not shown), and also various equipment such as a cooling fan 13. A ventilator 13d for the cooling fan 13 is provided on the side surface 6 of the casing 1.

Figure 5:
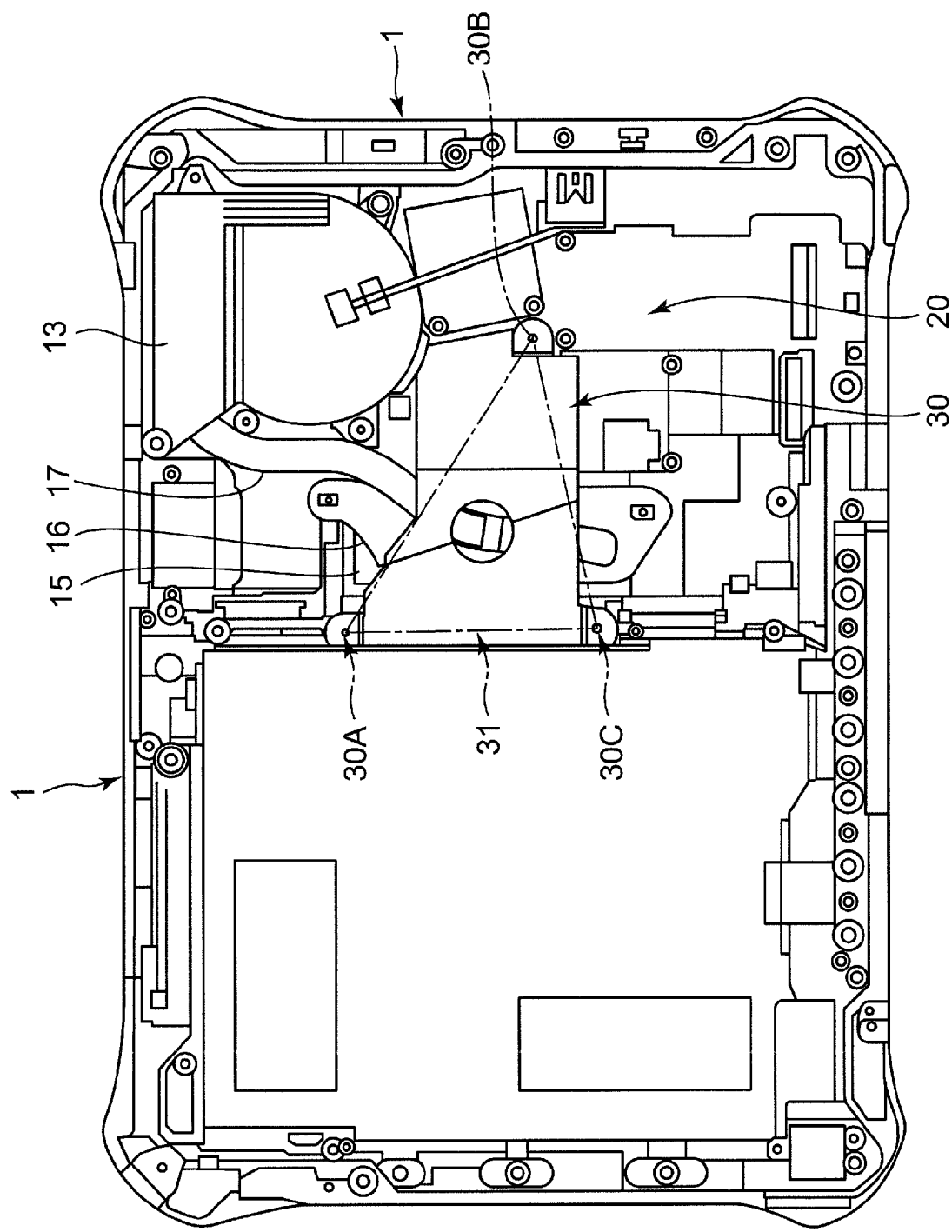
FIG. 5 is a plane view illustrating an inside the tablet terminal device in a state where an upper surface side of a casing is removed.
Figure 6:
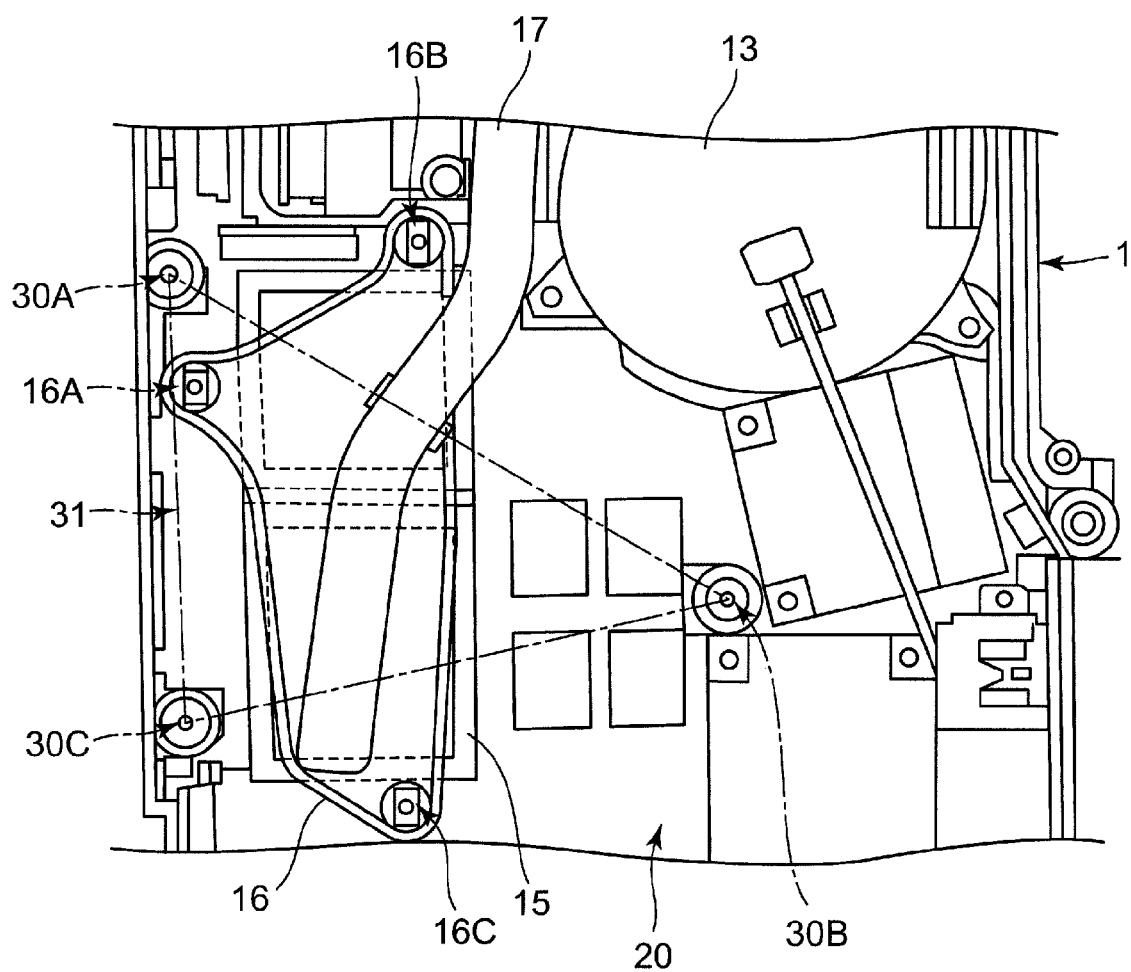
FIG. 6 is an enlarged plane view illustrating a major portion of the inside the tablet terminal device in a state where a protection plate is removed in FIG. 5.
Figure 7:
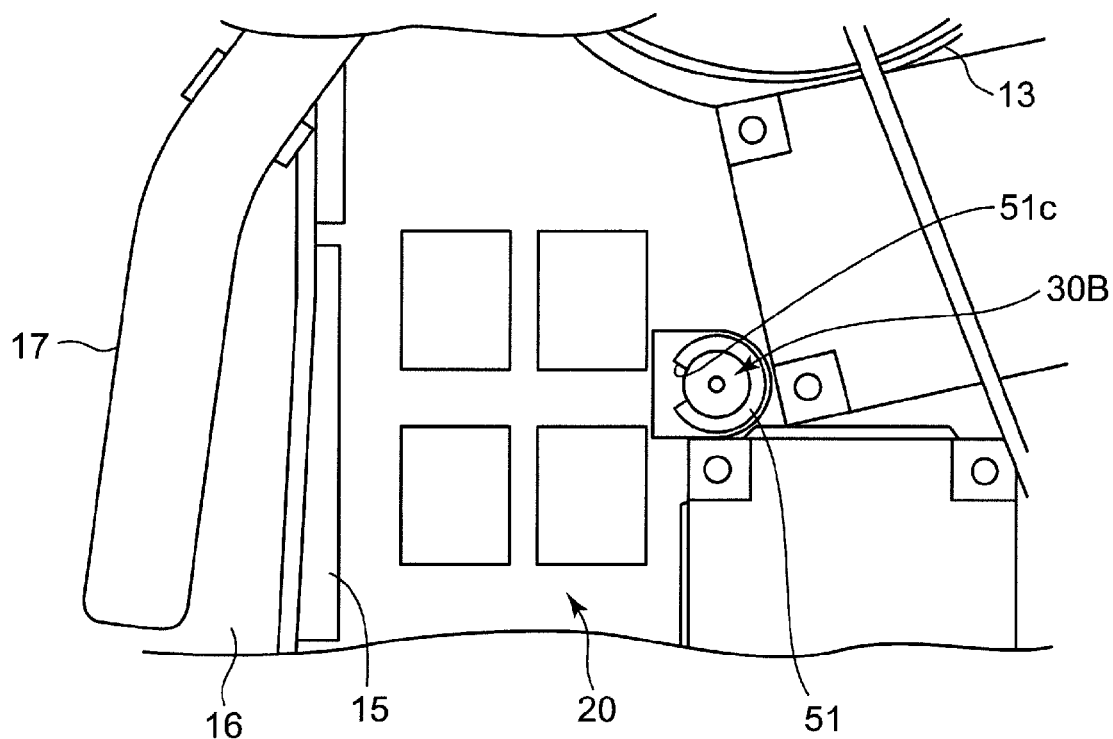
FIG. 7 is a further enlarged plane view illustrating a major portion of FIG. 6.

FIG. 5 is a plane view illustrating an inside the tablet terminal device W in a state where an upper surface side of a casing 1 is removed; FIG. 6 is an enlarged plane view illustrating a major portion of the inside the tablet terminal device W in a state where a protection plate 30 is removed in FIG. 5; and FIG. 7 is a further enlarged plane view illustrating a major portion of FIG. 6.

As shown in FIG. 5, inside the casing 1 of the tablet terminal device W, a printed circuit board (hereinafter, appropriately referred to as simply "substrate") is housed and held at side of the section where the battery pack 10 is loaded therein. Various electronic components such as signal processing circuits and CPUs are mounted on the printed circuit board (substrate).

As shown in FIG. 6, the CPU 15 is arranged diagonally to the side of the cooling fan 13, and a heat-sink 16 is arranged above the CPU 15. The heat-sink 16 is made of the material with required rigidity and radiation properties, such as copper or steel and the like. The heat-sink 16 is fixed to the casing 1, together with the substrate 20, at three fixation parts 16A, 16B and 16C. Further, a heat-transfer member 17 (so-called heat-pipe) is attached onto the upper surface of the heat-sink 16. The heat-pipe 17 is made of a material with required heat-transfer property, such as copper. An end portion of the heat-pipe 17 is connected to the cooling fan device 13. Heat generated by CPU 15 during the operation of the tablet terminal device W is promptly diffused outward by the cooling fan device 13 via the heat-sink 16 and the heat-pipe 17.

As shown in FIG. 5, a protection plate 30 made of e.g. steel is arranged above the heat-pipe 17. The protection plate 30 is to serve as a protection member configured to cover and protect at least a part of the front surface of the substrate 20

(that is, a part corresponding to a major portion of the CPU 15). The protection plate 30 is located at the back side of a liquid crystal unit (not shown) for the display screen 2c disposed at the upper surface 2 of the casing 1. And, in a case where a pressure is applied to the display screen 2c, for example, the protection plate 30 is capable of receiving the pressure via the liquid crystal unit. Thereby, it is possible to support the back surface of the liquid crystal unit and to protect the CPU 15 on the substrate 20.

The protection plate 30 is fixed to the casing 1, together with the substrate 20, at three fixation parts 30A, 30B and 30C. These three fixation parts 30A, 30B and 30C are not in alignment with each other in a plane view, and at least a major portion of a CPU 15 is arranged within the region of a triangle 31 formed by the three fixation parts 30A, 30B and 30C.

In the present embodiment, for the purpose of restraining the direct transmission of the deflection caused on the casing 1 to the substrate 20, when a load is applied to the casing 1 and thereby causing the deflection thereof, the substrate 20 is not rigidly fixed to the casing 1, but the specified fixation part can displace to some extent in a direction along the surface of the substrate 20 even when a deflection of the casing 1 is caused. Further, in this embodiment, it is possible to elastically absorb the component of the deflection in the direction perpendicular to the surface of the substrate 20 even when a deflection of the casing 1 is caused.

Figure 8:
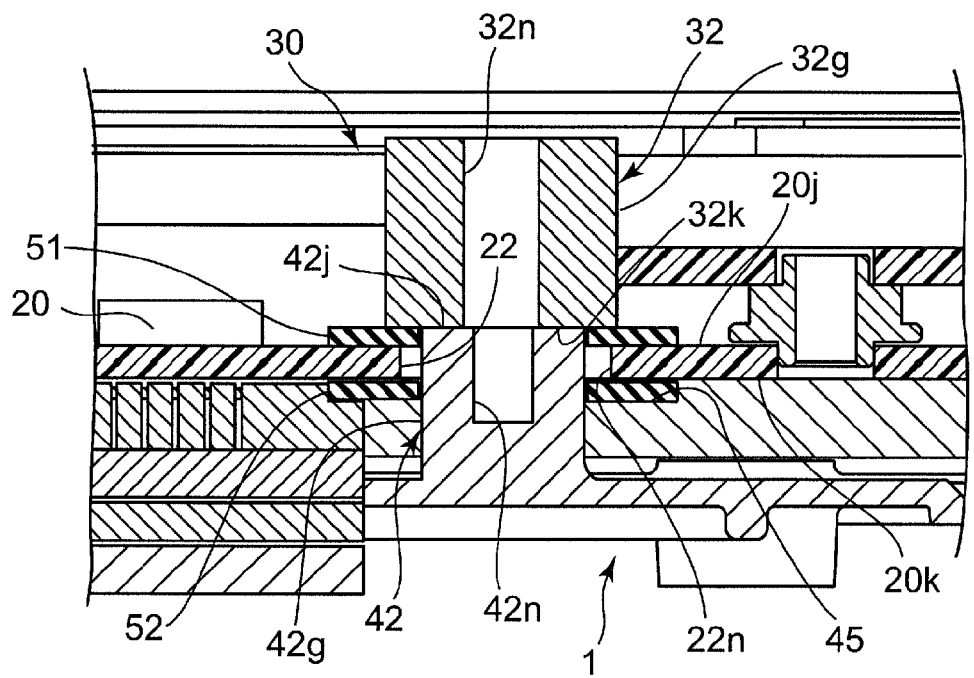
FIG. 8 is a vertical cross-sectional view illustrating an assembled state of a fixation hole of a substrate and a first and a second elastic bodies.

Next, a fixation structure of the substrate 20 to the casing 1 will be explained, referring to the cross-sectional drawing shown in FIG. 8. FIG. 8 is to illustrate the fixation structure, taking a part corresponding to one fixation part (the fixation part 30B, for example) among the three fixation parts 30A, 30B and 30C of the protection plate 30 as an example.

A circular fixation hole 22 for fixing the substrate 20 to the casing 1 is formed at the part corresponding to the fixation part 30B of the protection plate 30. On the other hand, under the substrate 20 in the casing 1, a cylindrical boss 42 to be inserted into the fixation hole 22 is integrally formed with the casing 1 at a part corresponding to the fixation hole 22. The boss 42 is configured so that its tip protrudes upward from the substrate 20 in a state where the boss 42 is inserted into the fixation hole 22 of the substrate 20. At the center of the boss 42, there is provided with a screw hole 42n into which a fixation screw (not shown) is screwed.

The positional relationship and sizes of the fixation hole 22 and the boss 42 are designed so that the outer periphery 42g of the boss 42 is apart by a predetermined amount from the inner periphery 22n of the fixation hole 22, in the state where the boss 42 is inserted into the fixation hole 22. Accordingly, even when a deflection of the casing 1 is caused, the boss 42 can displace within the fixation hole 22 of the substrate 20 in a direction along the surface of the substrate 20. Thereby, even when a deflection of the casing 1 is caused, it is possible to effectively restrain the transmission of the deflection caused in the casing 1 to the substrate 20. It is to be noted that the boss 42 may be referred to as "first fixation member" in the present disclosure.

On the other hand, a substrate-retentive portion 32 is formed, at the fixation part 30B of the protection plate 30, so as to face to the boss 42. The substrate-retentive portion 32 is formed into a hollow circular cylinder. The bottom surface 32k of the substrate-retentive portion 32 is in abutting contact with the top surface 42j of the boss 42 in an assembled state. The outer periphery 32g of the substrate-retentive portion 32 has a larger diameter than that of the outer periphery 42g of the boss 42. And, the inner periphery 32n of the substrate-retentive portion 32 has a smaller diameter than that of the screw hole 42n of the boss 42. Therefore, it is possible to insert the above-mentioned fixation screw (not shown) into the hollow part of the substrate-retentive portion 32 from above and screw into the screw hole 42n of the boss 42 without problem. It is to be noted that the protection plate 30 having the substrate-retentive portion 32 may be referred to as "second fixation member" in the present disclosure.

In the present embodiment, an elastic body 51 (a first elastic body) having a required elastic property is sandwiched between the bottom surface 32k of the substrate-retentive portion 32 and the front surface 20j of the substrate 20. On the other hand, a flat receiving surface 45 is formed by a part of the casing 1 in a surrounding area of the outer periphery 42g of the boss 42 at a predetermined height thereof. And, an elastic body 52 (a second elastic body) having a required elastic property is sandwiched between the back surface 20k of the substrate 20 and the receiving surface 45, in a surrounding are of the fixation hole 22. Various kinds of materials having the required elastic properties such as rubber, soft synthetic resin and the like may be employed as materials of the first and the second elastic bodies.

As described above, in the present embodiment, the first elastic body 51 is sandwiched between the bottom surface 32k of the substrate-retentive portion 32 and the front surface 20j of the substrate 20, and the second elastic body 52 is sandwiched between the receiving surface 45 which constitutes a part of the casing 1 and the back surface 20k of the substrate 20. Thereby, even when a deflection of the casing 1 is caused, it is possible to absorb the component of the deflection, within the elastic range of the first and the second elastic bodies 51 and 52, in the direction perpendicular to the front and the back surfaces 20j and 20k of the substrate 20. Consequently, it is possible to reduce an adverse effect of the deflection of the casing 1 in that direction.

In the example shown in FIG. 8, the flat receiving surface 45 is formed by a part of the casing 1, in order to receive the bottom surface of the second elastic body 52. Alternatively, the boss 42 may be formed as a well-known stepped boss integrally formed with the casing 1, and the second elastic body 52 may be sandwiched between the back surface 20k of the substrate 20 and the step surface forming the step of the stepped boss. In this case, it is possible to simplify the structure of the assembling portion of the substrate 20 and the second elastic body 52, and enhance the workability in assembly work.

Further, in the example shown in FIG. 8, by covering at least a part of the front surface 20j side of the substrate 20 with the protection plate 30, it is possible to protect the electronic component (e.g. CPU 15) on the substrate 20 in the covered region by the protection plate 30. Further, in the case where the above described structure is employed, it is possible to obtain the above described effect by utilizing the protection plate 30.

Furthermore, in the present embodiment, a notch oriented to a predetermined direction may be formed in at least one of the first and the second elastic bodies 51 and 52. As shown in FIG. 7, for example, a notch 51c oriented to the direction in which CPU 15 is disposed may be formed in at least the first elastic body 51.

With this structure, due to the absence of elastic material in the notch 51c, it is possible to adjust the elastic displacement property of the first elastic body 51 so that the elastic displacement in the direction to which the notch 51c is oriented is larger than those in other directions by the thickness of the elastic body 51. In other words, it is possible to provide the elastic function by the elastic body 51 with the directivity. Therefore, by orienting the direction to which the notch 51c is oriented to a direction of a region in which a more important electronic component (e.g. CPU 15) or more sensitive electronic component (e.g. CPU 15) to the strain is arranged, it is possible to effectively reduce an adverse effect on the electronic component caused from the deflection of the casing 1.

In the example shown in FIG. 7, the notch 51c is formed by cutting away one portion of the elastic body 51. Alternatively, a plurality of notches may be formed in one elastic body. Further, it is possible to provide the elastic function by the elastic body with the directivity so that a desired elastic function is obtained in a predetermined direction, by adjusting the width of the notch or the hardness of the elastic body.

In the present embodiment, as shown in FIGS. 5 and 6, the substrate 20 and the protection plate 30 is fixed to the casing 1 at three fixation parts 30A, 30B and 30C. These three fixation parts 30A, 30B and 30C are not in alignment with each other in a plane view, and at least a major portion of a CPU 15 is arranged within the region of a triangle 31 formed by the three fixation parts 30A, 30B and 30C. With this structure, the transmission of the deflection caused in the casing 1 to the substrate 20 is effectively restrained in the triangular region 31 formed by the three fixation parts 30A, 30B and 30C. Therefore, by arranging at least a major portion of the CPU 15 in the triangular region 31, it is possible to effectively reduce an adverse effect on CPU 15 caused from the deflection of the casing 1.

As described above, the present embodiment has been described as an example of the technique of the present disclosure. For the purpose of this, the attached drawings and the detailed explanation have been provided.

As a consequence, the constituent elements in the attached drawings and the detailed explanation include not only constituent elements essential for solving a problem to be solved but also constituent elements that are just essential for illustrating the technique but inessential for solving a problem to be solved. Although such inessential constituent elements appear in the attached drawings and the detailed explanation, the inessential constituent elements are not regarded as being essential.

Although the above-described embodiment has been applied to the so-called tablet terminal device, the electronic device according to the present disclosure is not limited to this embodiment but can be effectively applied to other various kinds of electronic devices.

In this manner, the above-described embodiment is adapted only to illustrate the technique according to the present disclosure, and therefore, it can be variously changed, replaced, added, and omitted within the scope of claims or its equivalent scope.

INDUSTRIAL APPLICABILITY

The present disclosure is applicable to the electronic device including a substrate such as a printed circuit board and the like inside the casing thereof.

What is claimed is:

1. An electronic device, comprising:
a casing;
a substrate which is arranged inside the casing, and provided with a fixation hole;
a fixation member which is integrally formed with the casing, and inserted into the fixation hole of the substrate, and positioned therein so that an outer periphery thereof is apart from an inner periphery of the fixation hole, the inner periphery of the fixation hole surrounding the outer periphery of the fixation member while having a space therebetween; and a first elastic body which is disposed in a surrounding area of the fixation hole, and sandwiched between the casing and a front surface of the substrate, wherein a top surface of the fixation member is coplanar with a front surface of the first elastic body.

2. The electronic device according to claim 1, further comprising:
a second elastic body which is disposed in a surrounding area of the fixation hole, and sandwiched between the casing and a back surface of the substrate.

3. The electronic device according to claim 2,
wherein the fixation member comprises a first fixation member and a second fixation member;
wherein a tip of the first fixation member protrudes from the substrate in a state where the first fixation member is inserted into the fixation hole; and
wherein a part of the second fixation member faces to the first fixation member, and the first or the second elastic body is disposed between the part of the second fixation member and the substrate.

4. The electronic device according to claim 2,
wherein a part of the fixation member is a stepped boss integrally formed with the casing, and
wherein the first or the second elastic body is disposed between a step surface of the stepped boss and the substrate.

5. The electronic device according to claim 2, wherein a notch oriented to a predetermined direction is formed in at least one of the first and the second elastic bodies.

6. The electronic device according to claim 1, wherein the fixation member is a protection member configured to cover and protect at least a part of the front surface of the substrate.

7. The electronic device according to claim 1, wherein the substrate includes three fixation holes which are not in alignment with each other in a plane view, at least a major portion of a Central Processing Unit is arranged within a triangular region formed by the three fixation holes.

* * * * *